(12) United States Patent
Li et al.

(10) Patent No.: US 8,935,276 B2
(45) Date of Patent: Jan. 13, 2015

(54) APPARATUS FOR AND METHOD OF HANDLING DATA ANALYSIS

(75) Inventors: Shao Chun Li, Beijing (CN); Xiao Hua Sun, Beijing (CN); Qiang Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 13/171,900

(22) Filed: Jun. 29, 2011

(65) Prior Publication Data

US 2012/0005229 A1 Jan. 5, 2012

(30) Foreign Application Priority Data

Jun. 30, 2010 (CN) .......................... 2010 1 0222480

(51) Int. Cl.
*G06F 17/30* (2006.01)
*G06Q 10/10* (2012.01)
*G06Q 10/06* (2012.01)

(52) U.S. Cl.
CPC .............. *G06Q 10/107* (2013.01); *G06Q 10/06* (2013.01)
USPC ............................ 707/769; 707/805; 715/200

(58) Field of Classification Search
CPC ................................................. G06F 17/30554
USPC ............................ 707/769, 756, 805; 715/200
See application file for complete search history.

(56) References Cited

U.S. PATENT DOCUMENTS

| | | | | |
|---|---|---|---|---|
| 6,499,036 B1 * | 12/2002 | Gurevich | ...................... | 707/778 |
| 6,725,229 B2 * | 4/2004 | Majewski et al. | ............. | 707/769 |
| 7,644,371 B2 * | 1/2010 | Robertson et al. | ............ | 715/810 |
| 7,783,678 B2 * | 8/2010 | Kim | ............................. | 707/805 |
| 7,941,438 B2 * | 5/2011 | Molina-Moreno et al. | ... | 707/756 |
| 2009/0254847 A1 * | 10/2009 | Counts et al. | ................. | 715/771 |
| 2009/0254849 A1 * | 10/2009 | Glaser-Seidnitzer et al. | | 715/771 |
| 2010/0114931 A1 * | 5/2010 | Xie et al. | ...................... | 707/759 |
| 2011/0153368 A1 * | 6/2011 | Pierre et al. | ....................... | 705/4 |
| 2012/0232939 A1 * | 9/2012 | Pierre et al. | ....................... | 705/4 |
| 2014/0096249 A1 * | 4/2014 | Dupont et al. | .................. | 726/23 |

FOREIGN PATENT DOCUMENTS

CN 101093481 12/2007

OTHER PUBLICATIONS

Mark Derthick, John Kolojejchick, Steven F. Roth, "An Interactive Visual Query Environment for Exploring Data", Proceedings of the ACM Symposium on User Interface Software and Technology (UIST '97), ACM Press, Oct. 1997, pp. 189-198.

* cited by examiner

*Primary Examiner* — Robert Beausoliel, Jr.
*Assistant Examiner* — Alexandria Bromell
(74) *Attorney, Agent, or Firm* — Vazken Alexanian (57) ABSTRACT

A method and apparatus for handling data analysis. The apparatus includes an editing device which adds user-specified one of a plurality of operation units to a user-specified layer in a data analysis in response to a user operation, each of the operation units performing a predetermined processing on an associated data source, a connecting device which connects at least one user-specified operation unit in the data analysis to an analysis path in response to a user operation, and a user interface. The user interface receives the user operations and displays the data analysis by representing layers in the data analysis, operation units in the layers and connections on the analysis path in a visual manner.

14 Claims, 7 Drawing Sheets

APPARATUS FOR AND METHOD OF HANDLING DATA ANALYSIS

CROSS-REFERENCE TO RELATED APPLICATION

This application claims priority under 35 U.S.C. §119 to Chinese Patent Application No. 201010222480.8 filed Jun. 30, 2010, the entire contents of which are incorporated by reference herein.

FIELD OF THE INVENTION

The present invention relates to a data analysis technique, and more particularly, to a method of and an apparatus for handling a data analysis.

BACKGROUND OF THE INVENTION

During their growth, enterprises and organizations have gradually developed various independent or interrelated application systems to support daily execution and management thereof, such as transaction processing system, accounting system, ERP system, human resource management system, billing system, call center or the like. Today, as the information technique is evolving continuously, utilization of information by people tends to be increasingly complex. In addition to transaction processing operations such as adding, deleting, modifying transaction data or the like and obtaining a simple statistical summary on the transaction data, it is also required to perform various complex analyses such as long term tendency analysis, data mining or the like on data (historical or present) to support decisions.

A data analysis system is a computer application system which can convert data into information or knowledge, comprising online analysis, query and report, prediction and analysis, professional quantitative analysis, data mining, visualized data application, analytic customer relation management and the like. For example, Tableau developed by Tableau Software Corporation (North 34th Street, Suite 400, Seattle, Wash. 98103) is an example of such a data analysis system.

A typical data analysis system usually has to process a large amount of data. Different dimensions of information on the data are developed and exhibited by providing tools for defining and designing data analyses, or even means for directly programming, and combining visualization techniques such as graph or the like, thereby assisting analyzers to complete analyzing tasks better. Conventional data analysis systems can be roughly classified into two classes.

One class focuses on simplifying the execution of the analyzing tasks, to enable ordinary users to complete the analyzing tasks which have otherwise been completed only by professional analyzers as usual. This kind of analysis systems emphasize particularly on providing visual and easy interactive analyzing operations while presenting results of the data analyses. Users need not remember corresponding analyzing operations. However, there is a drawback that it is difficult to extend to and support flexible and complex analyzing tasks. Another class focuses on providing capability of flexible and complex analyzing tasks and scalability. This kind of systems are usually directed to professional analyzers and rely on users who are familiar with data analysis commands of specific analysis systems, thereby increasing requirements for ordinary users to utilize these systems.

SUMMARY OF THE INVENTION

It is an object of the present invention to improve usability of analysis systems while supporting flexible and complex analyzing tasks.

The inventors seek to provide an apparatus for and a method of handling data analyses, making it possible to construct complex data analyses with simple units in a visual manner, thus improving usability of the analysis systems and enabling to complete various flexible and complex analyzing tasks. The method and the apparatus are not limited to a specific analysis system, and have good scalability.

According to one embodiment of the present invention, an apparatus for handling a data analysis can include an editing device which adds user-specified one of a plurality of operation units to a user-specified layer in a data analysis in response to a user operation, each of the operation units performing a predetermined processing on an associated data source, a connecting device which connects at least one user-specified operation unit in the data analysis to an analysis path in response to a user operation, and a user interface which receives the user operations and displays the data analysis by representing layers in the data analysis, operation units in the layers and connections on the analysis path in a visual manner.

According to another embodiment of the present invention, a method of handling a data analysis can include receiving a user operation, editing the data analysis, where the editing step is adding user-specified one of a plurality of operation units to a user-specified layer in a data analysis in response to a user operation, each of the operation units performing a predetermined processing on an associated data source, connecting at least one user-specified operation unit in the data analysis to an analysis path in response to a user operation, and a displaying step of displaying the data analysis by representing layers in the data analysis, operation units in the layers and connections on the analysis path in a visual manner.

BRIEF DESCRIPTION OF THE DRAWINGS

The above and/or other aspects, features and/or advantages of the present invention will be easily appreciated in view of the following description by referring to the accompanying drawings. In the accompanying drawings, identical or corresponding technical features or components will be represented with identical or corresponding reference numbers. In the accompanying drawings, it is not necessary to present size and relative position of elements in scale.

DETAILED DESCRIPTION OF THE PREFERRED EMBODIMENTS

Aspects of the present invention are described below with reference to flowchart illustrations and/or block diagrams of methods and apparatus according to embodiments of the invention. It is to be noted that, for purpose of clarity, representations and descriptions about those components and processes known by those skilled in the art but unrelated to the present invention are omitted in the drawings and the description. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It should be noted that the flowchart and block diagrams in the figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
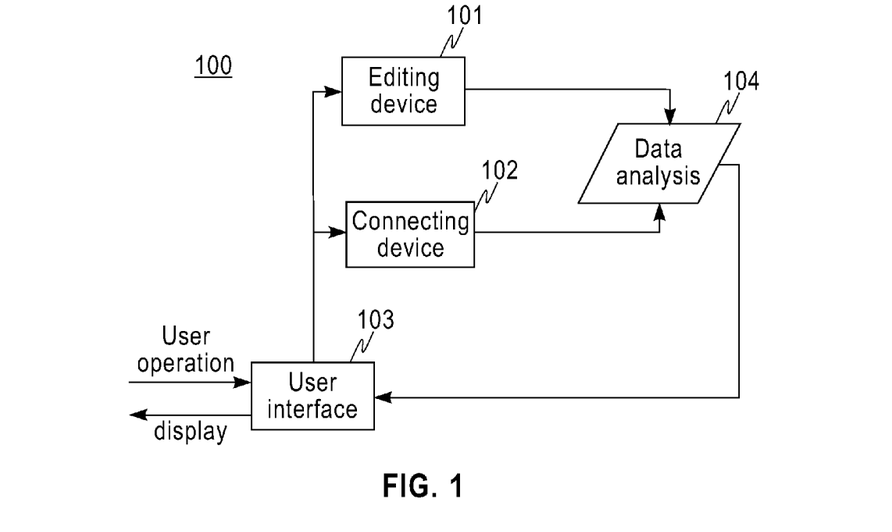
FIG. 1 is a block diagram showing an exemplary structure of an apparatus for handling a data analysis according to an embodiment of the present invention.

FIG. 1 is a block diagram showing an exemplary structure of an apparatus 100 for handling a data analysis according to an embodiment of the present invention.

As shown in FIG. 1, the apparatus 100 for handling a data analysis includes an editing device 101, a connecting device 102 and a user interface 103.

The editing device 101 adds user-specified one of a plurality of operation units to a user-specified layer in a data analysis 104 in response to a user operation. It is possible to define for each of the operation units a sequence of instructions which can be executed by a data analysis system (for example, an analysis execution engine of the data analysis system) to complete a predetermined function of the operation unit.

In the embodiments of the present invention, a data analysis is a set of operation units executed in the data analysis system for a user's analysis purpose. The data analysis includes both operation units and execution order in which a portion or all of the operation units are executed by the data analysis system (for example, an analysis execution engine of the data analysis system). This execution order is also called or present as an analysis path. When the data analysis is submitted to the data analysis system (for example, the analysis execution engine of the data analysis system), the data analysis system can obtain operation units connected on an active analysis path in the data analysis and execute the obtained operation units in the execution order determined by the active analysis path.

Figure 2:
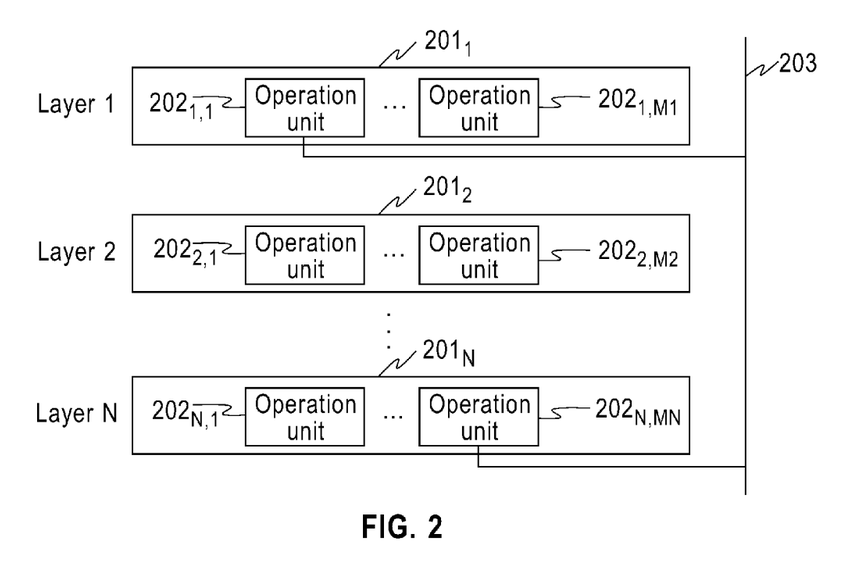
FIG. 2 is a schematic diagram showing the logical structure of a data analysis.

FIG. 2 is a schematic diagram showing the logical structure of a data analysis. As shown in FIG. 2, the data analysis includes layers $201_1, 201_2, \ldots, 201_N$ (to represent the order of the layers, the layers are labeled with layers to layer N in order in the figure), wherein N is greater than or equal to 1.

Each layer can be empty. For example, when the apparatus 100 initially creates a data analysis in response to a request from the user to generate the data analysis, the data analysis can include a predetermined number of layers, and the layers are initially empty. For another example, when the user inserts or appends one layer into the data analysis, the layer is initially empty. Each layer can also include one or more operation units. For example, a layer $201_1$ includes operation units $201_{1,1}, \ldots, 201_{1,M1}$, a layer $201_2$ includes operation units $201_{2,1}, \ldots, 201_{2,M2}, \ldots$, a layer $201_N$ includes operation units $201_{N,1}, \ldots, 201_{N,MN}$, wherein M1, M2, ..., MN are greater than or equal to 0.

Operation units in a preceding layer are executed more preferentially in order than those in the following layers. The data analysis can include one or more analysis paths. For simplification, only one analysis path 203 is shown in FIG. 2. Operation units in one layer can be connected to one or more analysis paths. Each analysis path represents a sequence of execution of operation units, and also corresponds to the execution sequence of one analysis by the user, where the connected operation units are executed in the execution order of layers which the operation units belong to. An analysis path can be set in a standby state or an active state. There is only one active analysis path in a data analysis, and the active analysis path corresponds to an exhibition of analysis result presently present by the data analysis system to the user.

At time of adding an operation unit, the user-specified layer can be that existing in the data analysis. Further, the editing device 101 can also insert or append a new layer into a specified location in the data analysis 104 according to an instruction for inserting or appending the layer from a user operation, and add the operation unit to the layer. In the latter case, the order of the layers after inserting or appending the new layer can be maintained by the editing device 104, for example.

Each operation unit is associated with an associated data source so as to perform a predetermined processing on the associated data source. Processing result from the predetermined processing can serve as an associated data source for another operation unit. The associated data source can be any data source having a data format which can be processed by the data analysis system (for example, the analysis execution engine of the data analysis system), for example, but not limited to database table, electronic sheet, text file or the like.

The user can perform analyses on the data in different aspects and to different extents in predetermined order during the analyses. Depending on an object to be achieved by each step in the analysis procedure, operation units can be of different types.

The predetermined processing for an operation unit includes, for example, but not limited to one or more of searching the associated data source for a record meeting a condition, performing a transaction processing on the associated data source, and changing the manner for presenting data of the associated data source in the data analysis system.

In case of the predetermined processing of the operation unit of searching the associated data source for a record meeting a condition, the operation unit is associated with information for instructing the data analysis system on how to gather statistics from the searched record and how to present the statistical result. Such an operation unit is also called as a searching operation unit. For example, the associated data source for an operation unit is a database table including records about emails, and the searching condition is "transmitting time falls within a specified time period". It is the predetermined processing for the operation unit to search the email data records for those about all the emails transmitted within a time period.

Figure 3A:
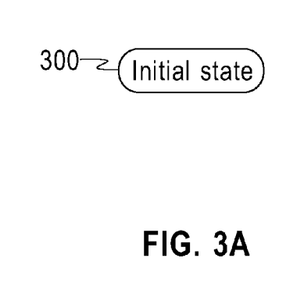
FIGS. 3a to 3i schematically show an example of adding operation units in an exemplary email analysis system.
Figure 3B:
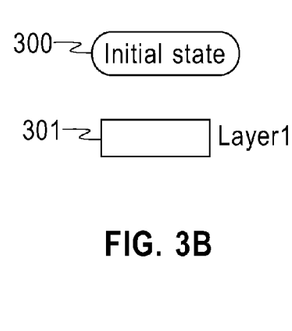
Figure 3C:
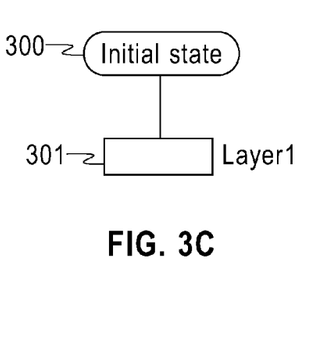
Figure 3D:
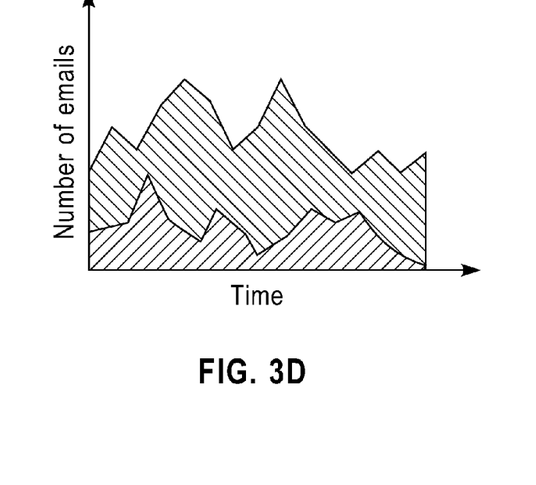

Information associated with the operation unit instructs the data analysis system to, with respect to each of domain names in transmitter email addresses presenting in the searched email records, calculate a distribution of the number of emails in the searched email records within the specified time period, wherein the transmitter email addresses of the emails belong to the each of domain names. The information associated with the operation unit also instructs the data analysis system to display the statistical result in form of curve chart, and consequently, the data analysis system presents the statistical result in form of, for example, but not limited to that in FIG. 3(*d*), wherein each curve represents a distribution corresponding to one domain name of transmitter email addresses.

As an example, the searching condition for a searching operation unit can be "taking all the records of the associated data source as the searched records". Such an operation unit can be called as one of primary class.

As an example, in case of executing a searching operation unit after a previous operation unit, the searching condition for the searching operation unit can be "taking the records searched by the previous operation unit as the searched records". The associated information can instruct the data analysis system to gather statistics from the searched records in a manner finer than the previous operation unit (that is, to gather statistics according to smaller-grained classes), and instruct the data analysis system to present the statistical result in a presenting manner identical to the previous operation unit. Such an operation unit can be called as one of auxiliary class.

As an example, the searching condition for a searching operation unit can be "further filtering the records searched by the previous operation unit with a specified searching condition". The associated information is identical to that associated with the previous operation unit that is instructing the data analysis system to gather statistics from the filtered records in a manner identical to the previous operation unit, and presents the statistical result in the same presenting manner. Such an operation unit can be called as one of subordinative class.

The transaction processing includes, for example, but not limited to operation, data modification, addition and deletion performed with respect to an associated data source. An operation unit having transaction processing as its predetermined processing is called as a transaction operation unit. For example, through a transaction operation unit, it is possible to calculate a result based on values of a field in records and write result in another field of the records. The transaction operation unit enables obtaining derived data based on the searching result as the object of a further analysis.

An operation unit is called as a switching operation unit in case that the operation unit defines the predetermined processing of instructing the data analysis system to present the statistical result obtained when the data analysis system executes a previous operation unit, wherein the statistical result is presented in a specified presenting manner. The user can utilize a switching operation unit to observe the statistical result in different manners or different facets. For example, the statistical result is observed in form of curve chart through a previous operation unit, and is observed in form of pie chart or bar chart through a subsequent switching operation unit. For another example, some data facets of the statistical result are observed through a previous operation unit, and other data facets of the statistical result are observed through a subsequent switching operation unit.

Depending on the type of searching conditions, operation units can be classified into different classes. For example, operation units can adopt searching conditions based on AND logic, searching conditions based on OR logic, searching conditions based on NOT logic, or searching conditions based on other combinational logic.

Operation units can be predefined. Operation units can also be created by users as required. For example, it is possible to adopt the method of creating sheets in Tableau.

By taking an email analysis system as an example, it is possible to have the following operation units.

| Operation units | Searching conditions | Method of gathering statistics |
|---|---|---|
| Sender_Domain | Non-limited | With respect to each of domain names of transmitter email addresses, calculating a distribution of the number of emails with the same domain name of transmitter email addresses on a time axis. |
| Sender_Author | Non-limited | Adding a statistical dimension of transmitter email address to the previous method of gathering statistics |

-continued

| Operation units | Searching conditions | Method of gathering statistics |
|---|---|---|
| Not_Sender_Domain | Excluding records having a transmitter email address with the same domain name as a specified domain name | Adopting the previous method of gathering statistics |
| Author | Searching for records with the same transmitter email address as a specified email address | Adopting the previous method of gathering statistics |

Returning to FIG. 1, the user interface 103 displays the data analysis by representing layers in the data analysis, operation units in the layers and connections on the analysis path in a visual manner. For example, the user interface 103 can represent operation units and their classes, analysis paths and connections from the operation units to the analysis paths by adopting distinguishable graphics, text, symbols, combinations of two or three of graphics, text and symbols, or combinations of these with colors as icons. It is possible to represent layers through relative position relations between icons of operation units in a display interface. For example, layers are arranged in the order from top to bottom, and operation units in the same row belong to the same layer. It is also possible to represent layers and subordinative relations of operation unit to the layers with specific identifiers. For example, operation unit in the same layer are enclosed within an area.

The user interface 103 also receives user operations, for example, but not limited to instruction and data inputs from users through input devices such as mouse, keyboard, microphone, touch pad or the like. The user interface 103 notifies the editing device 101 and the connecting device 102 of the user operations (instruction and data inputs) according to the present input focus to which the user operations are directed. The input focus is for example, but not limited to buttons, menu options, input boxes or the like. If the present input focus belongs to the editing device 101, the editing device 101 is notified of the user operations. Similarly, if the present input focus belongs to the connecting device 102, the connecting device 102 is notified of the user operations.

For example, the user interface 103 displays a menu including an editing option and a connecting option. When a user selects the editing option (that is, issuing an instruction for entering into the editing state), the user interface 103 can display a predefined operation unit in a screen area. The user can add, through a drag-drop operation via a mouse, one of the predefined operation units to a location corresponding to the desired layer in the display area of the data analysis. The user interface 103 notifies the editing device 101 of the user operation while displaying this process. Afterwards, the user interface 103 can display an input window. The user inputs searching condition parameters (data input) for the operation unit in the input window, and the user interface 103 provides the input to the editing device 101 to set a searching condition for the operation unit.

Alternatively, for example, the user can activate the menu for adding an operation unit at a location corresponding to the desired layer in the display area of the data analysis through a right-click via a mouse. Predefined operation units are displayed in the menu for adding an operation unit. When the user left-clicks an operation unit to be added with the mouse, the user interface notifies the editing device 101 of the user operation while displaying the process. In adding the operation unit, it is possible to adopt a predefined searching condition, or set parameters for a searching condition.

The connecting device 103 connects at least one user-specified operation unit in the data analysis to an analysis path in response to a user operation.

For example, the user interface 103 can display a connecting tool. When the user selects to use the connecting tool, the operation unit is connected to the analysis path by drawing a line or connecting via a line on the screen. The user interface notifies the connecting device 102 of the user operation while displaying this process. Alternatively, for example, the user interface 103 can provide a selecting and connecting tool. When the user selects an operation unit to be connected to the analysis path and confirms the connection, the user interface notifies the connecting device 102 of the user operation while displaying the process.

The user interface 103 can implicitly or explicitly represent the analysis path. In case of implicitly representing, instead of displaying an analysis path separately, the user interface 103 forms the analysis path in order of layers by joining connections of operation units when the connecting device 102 connects the operation units to the analysis path. In case of explicitly representing, the user interface 103 displays a separate analysis path, and displays connection of operation units to the analysis path when the connecting device 102 connects the operation units.

The user interface 103 can display the connections as bypassing unrelated operation units. Preferably, in case that a connection passes by an unrelated operation unit, the user interface 103 can display the connection as adjoining with the unrelated operation unit in a manner such that the connection is distinguished from normal connections to operation units. For example, it is possible to display the connection as passing through the operation unit, except that portions of the connection outside the operation unit are displayed as solid lines, and a portion of the connection within the operation unit is displayed as a dashed line.

In case that there is a plurality of analysis paths, it is possible for the user to specify to the connecting device 102 the analysis path to be connected through the user interface 103. The user can also switch the presently active analysis path through the user interface 103. The user interface 103 can make the presently active analysis path distinguishable on the display interface in a visual manner. For example, the presently active analysis path is displayed in highlight, and the non-active analysis path is hidden, and so on. This facilitates the association between the displayed result of the data analysis system and the corresponding analysis path by the user, and further facilitates understanding and mining the meaning corresponding to the analysis result by the user.

Operation of the apparatus 100 will be described in connection with an example of the above email analysis system in the following.

FIG. 3 schematically shows an example of adding operation units in the above example.

As shown in part (a) of FIG. 3, there is no operation unit in the data analysis at beginning. To ease the description, an initial state 300 represent the start point of all the analysis paths is displayed in the area of the data analysis.

The user want to gather statistics on a distribution of the number of emails having the same domain name of transmitter email addresses over time, and thus adds an operation unit Sender_Domain 301 in an area of the data analysis (layer 1) through the user interface 103 and the editing device 102, as shown in part (b) of FIG. 3. Then the user connects the operation unit Sender_Domain 301 to the analysis path (the analysis path is represented implicitly) through the user interface 103 and the connecting device 102, as shown in part (c) of FIG. 3.

When the analysis execution engine (not shown) of the data analysis system executes the sequence of operation units specified by this analysis path, the analysis result as shown in part (d) of FIG. 3 is generated, wherein a longitudinal axis represents the number emails, a lateral axis represents time, and each curve represents a distribution of the number of emails having the same domain name of transmitter email addresses over time. Different curves correspond to different domain names of transmitter email addresses. Although only two curves are shown in FIG. 3(d), the actual number of curves depends on the number of domain names of transmitter email addresses included in specific data.

Figure 3E:
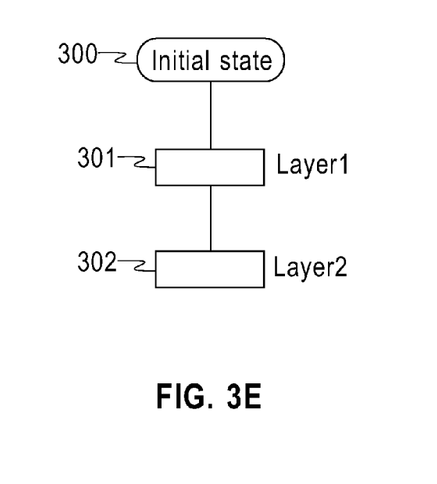
Figure 3F:
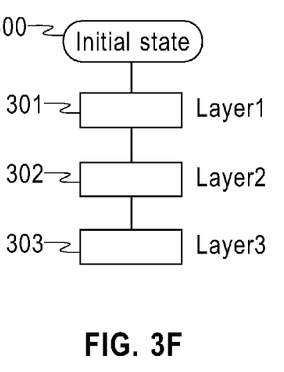
Figure 3G:
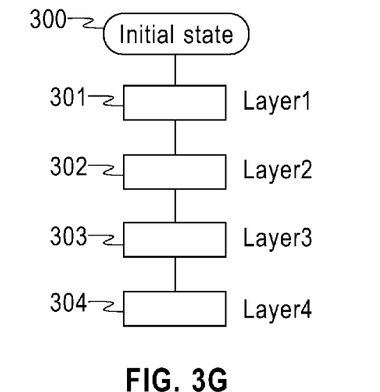

By analyzing the obtained analysis result, the user is not interested in emails with "somecompany.com" as the domain name of transmitter email addresses, and therefore an operation unit Not_Sender_Domain 302 is added in the area of the data analysis (layer 2) through the user interface 103 and the editing device 102, and the operation unit is defined with a searching condition of "containing no domain name "somecompany.com" of transmitter email addresses". The user connects the operation unit not_Sender_Domain 302 to the analysis path through the user interface 103 and the connecting device 102, as shown in part (e) of FIG. 3.

Based on the result obtained by executing the analysis path as shown in part (e) of FIG. 3, the user wants to further analyze a distribution of emails with the same domain name of transmitter email addresses but different transmitter email addresses. Then the user adds an operation unit Sender_Author 303 in the area of the data analysis (layer 3) through the user interface 103 and the editing device 102, and connects the operation unit Sender_Author 303 to the analysis path through the user interface 103 and the connecting device 102, as shown in part (f) of FIG. 3.

Based on the result obtained by executing the analysis path as shown in part (f) of FIG. 3, the user is much interested in emails with a transmitter "jeff@_lotusspace.com". Then the user adds an operation unit Author 304 in the area of the data analysis (layer 4) through the user interface 103 and the editing device 102, and defines a searching condition of "having a transmitter email address jeff@_lotusspace.com" in the operation unit. The user connects the operation unit Author 304 to the analysis path through the user interface 103 and the connecting device 102, as shown in part (g) of FIG. 3.

Figure 3H:
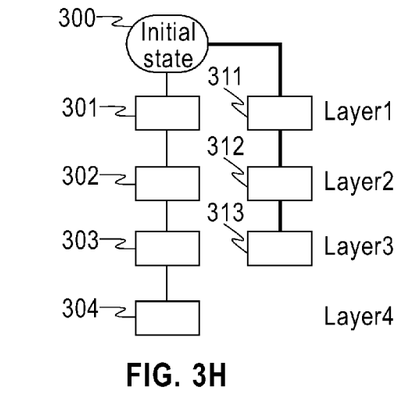

The user can further add operation units and define other analysis paths. FIG. 3 (h) shows an example of defining another analysis path where operation units 311, 312 and 313 are connected to a new analysis path. The analysis path is displayed as a thick line, so as to be represented as a presently active path distinguished from other analysis paths.

Figure 3I:
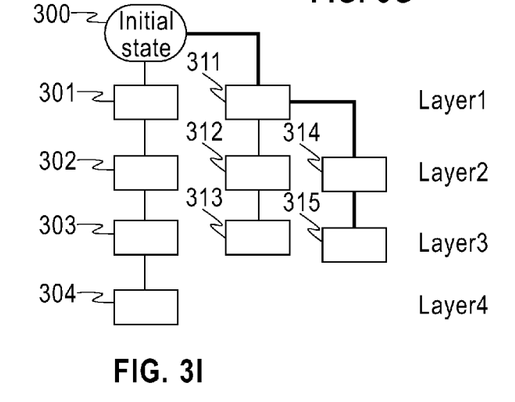

In the example of FIG. 3(h), the new analysis path starts from the initial state. However, the new analysis path can also start from an operation unit connected by an existing analysis path. This facilitates reusing a part or all of an existing analysis path. FIG. 3(i) shows an example of such an analysis path where operation units 311, 314 and 315 are connected to the new analysis path. In the example of FIG. 3(i), the operation unit 311 is an operation unit on the existing analysis path. The new analysis path is displayed as a thick line, so as to be represented as a presently active path distinguished from other analysis paths.

Figure 4:
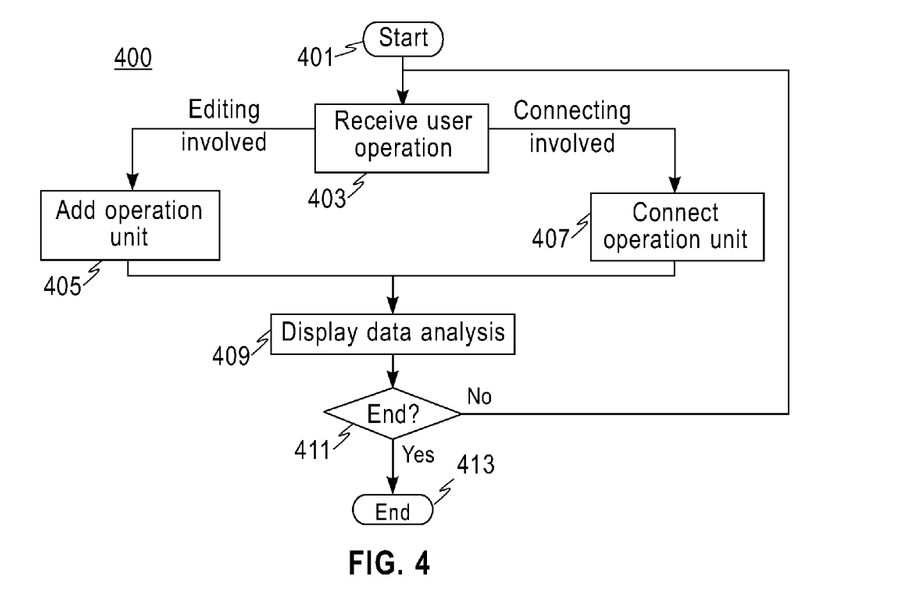
FIG. 4 is a flow chart showing the exemplary process of a method of handling a data analysis according to an embodiment of the present invention.

FIG. 4 is a flow chart showing the exemplary process of a method 400 of handling a data analysis according to an embodiment of the present invention.

As shown in FIG. 4, the method 400 starts from step 401. At step 403, a user operation is received. According to the present input focus to which the user operation is directed, it is determined whether the user operation (instruction and data input) relates to editing or connecting. If the operation relates to editing, at step 405, a user-specified one of a plurality of operation units is added to a user-specified layer in the data analysis in response to the user operation. If the operation relates to connecting, at step 407, at least one user-specified operation unit in the data analysis is connected to the analysis path in response to the user operation.

After steps 405 and 407, at step 409, the data analysis is displayed by representing layers in the data analysis, operation units in the layers and connections on the analysis path in a visual manner. Then at step 411, it is determined whether the process is to be ended. If it is to be ended, the method 400 ends at step 413, and if otherwise, the method 400 returns to step 403.

According to the above embodiments, because it is able to construct a complex analysis by arranging simple operation units in order and present a result of the arrangement in a visual manner, the user is enabled to handle the complex data analysis conveniently. Accordingly, requirements on the user's knowledge and skill can be reduced.

In some cases, for example, because the data analysis system (for example, the analysis execution engine of the data analysis system) and the data analysis comply with different format standards, the data analysis system cannot directly execute the analysis path generated in the data analysis. In this case, it is possible to convert the analysis path generated in the data analysis into a sequence of instructions which can be executed by the analysis execution engine.

Figure 5:
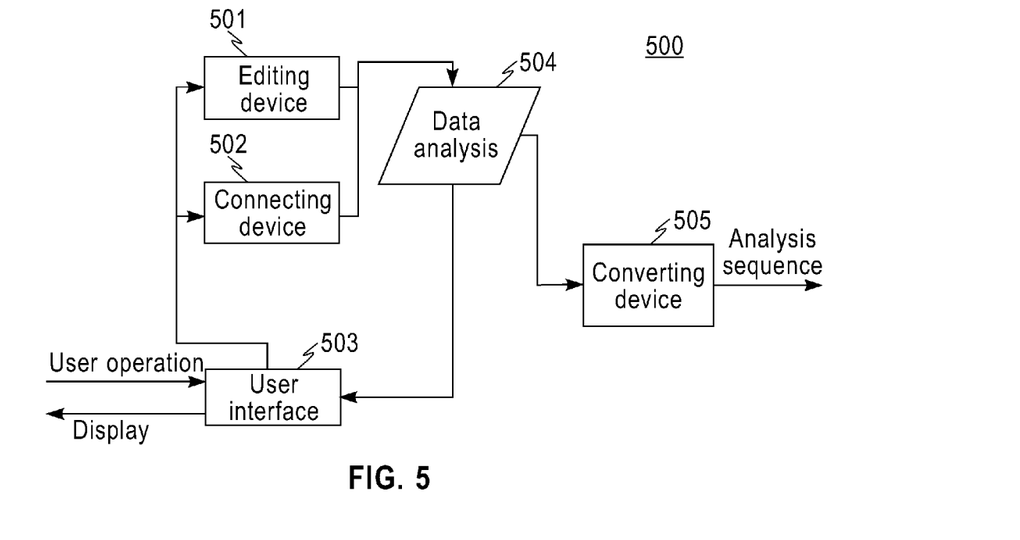
FIG. 5 is a block diagram showing an exemplary structure of an apparatus for handling a data analysis according to an embodiment of the present invention.

FIG. 5 is a block diagram showing an exemplary structure of an apparatus 500 for handling a data analysis according to an embodiment of the present invention.

As shown in FIG. 5, the apparatus 500 for handling an data analysis includes an editing device 501, a connecting device 502, a user interface 503 and a converting device 505. Among the portions as shown in FIG. 5, the editing device 501, the connecting device 502, the user interface 503 and the data analysis 504 are respectively identical to the editing device 101, the connecting device 102, the user interface 103 and the data analysis 104 described in connection with FIG. 1, and therefore, will not be described in detail hereafter.

In response to a user operation, the converting device 505 converts operation units connected in layers where the operation units connected on the analysis path in the data analysis 504 are located into instructions which can be understood by the data analysis system (for example, analysis execution engine) in order of the layers.

Figure 6:
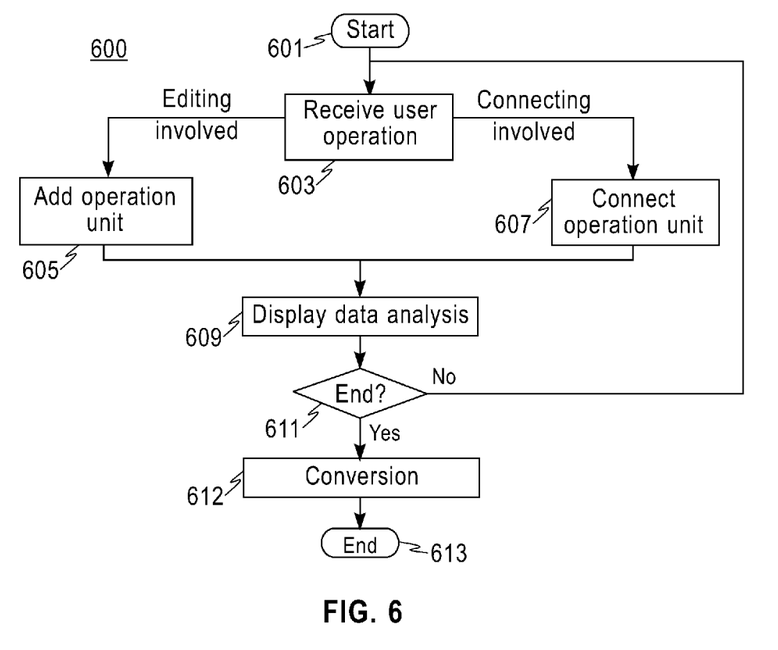
FIG. 6 is a flow chart showing the exemplary process of a method of generating a data analysis according to an embodiment of the present invention.

FIG. 6 is a flow chart showing the exemplary process of a method 600 of handling a data analysis according to an embodiment of the present invention.

Steps 603, 605, 607 and 609 in FIG. 6 are respectively identical to steps 403, 405, 407 and 409 described in connection with FIG. 4, and therefore, will not be described in detail hereafter.

At step 611, it is determined whether the process is to be ended. If it is to be ended, step 612 is executed, and if otherwise, the method returns to step 603.

At step 612, in response to a user operation, operation units connected in layers where the operation units connected on the analysis path are located are converted into instructions which can be understood by the data analysis system (for example, analysis execution engine) in order of the layers. Then the method ends at step 613.

According to the embodiments described in connection with FIGS. 5 and 6, by providing a device for converting between the instruction format which can be understood by a data analysis system and the instruction format of a data analysis, it is possible to provide the apparatus for and the method of handling data analyses with uniform design in data analysis systems from different manufacturers.

Figure 8A:
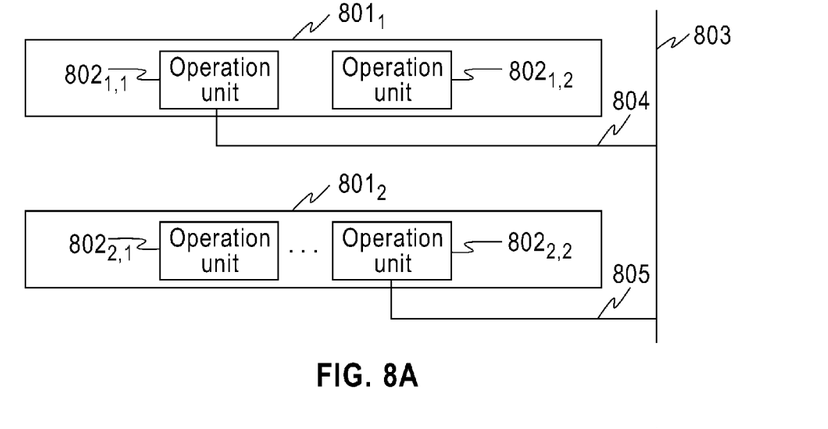
FIG. 8a to FIG. 8c show an example of deleting an operation unit.
Figure 8B:
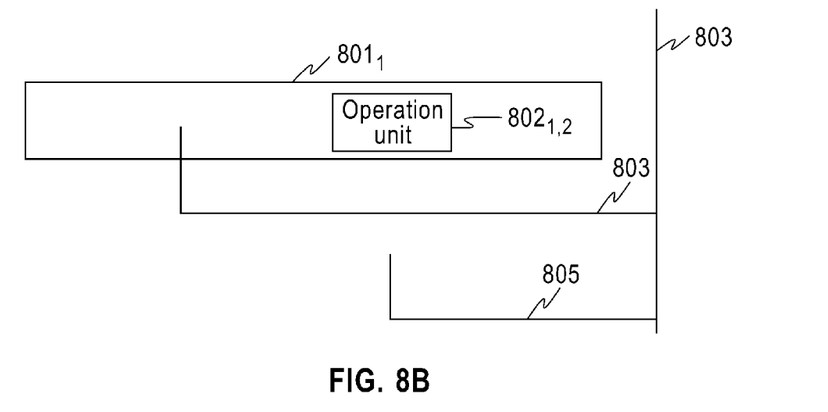
Figure 8C:
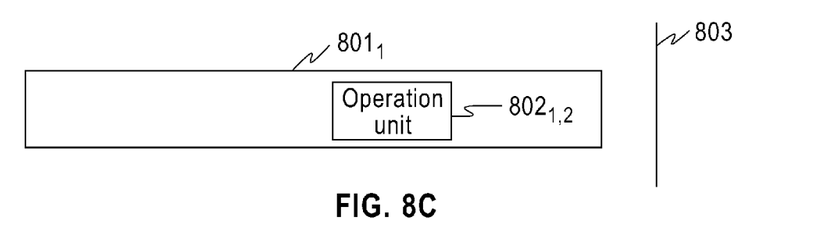

In further embodiments of the apparatus 100 and the apparatus 500, the editing device 101 and the editing device 501 can also delete a user-specified operating unit or layer from the data analysis in response to a user operation. Also, the user operation can be received and informed to the editing device by the user interface. In case that the deleted operating unit or an operation unit in the deleted layer is connected on an analysis path, the connecting device 102 and the connecting device 502 can also delete the connection from the deleted operating unit or the operation unit in the deleted layer to the analysis path. FIG. 8a to FIG. 8c show an example of deleting an operation unit.

FIG. 8a shows an example of a data analysis before deleting the operating unit, where an operating unit $802_{1,1}$ in a layer $801_1$ is connected to an analysis path 803 through a connection 804, an operating unit $802_{1,2}$ in the layer $801_1$ is not connected to the analysis path 803, an operating unit $802_{1,2}$ in a layer $801_2$ is connected to the analysis path 803 through a connection 805, and an operating unit $802_{2,2}$ in the layer $801_2$ is not connected to the analysis path 803. FIG. 8b shows the data analysis after the editing device 101 and the editing device 501 delete the operating unit $802_{1,1}$ and the layer $801_2$ from the data analysis in response to a user operation, where connections 803 and 804 still exist. FIG. 8c shows the data analysis after the connecting device 102 and the connecting device 502 delete the connection from the deleted operating unit or the operation unit in the deleted layer to the analysis path, where the connections 803 and 804 do not exist.

The step 405 and the step 605 can also include deleting a user-specified operating unit or layer from the data analysis in response to a user operation. The step 407 and the step 607 can also include, in case that the deleted operating unit or an operation unit in the deleted layer is connected on an analysis path, deleting the connection from the deleted operating unit or the operation unit in the deleted layer to the analysis path.

The editing device 101 and the editing device 501 can also change the layer where a user-specified operation unit locates or the position relation between the user-specified operation unit and another operation unit in the same layer in response to a user operation, for example, dragging and dropping the operating unit through a mouse.

The step 405 and the step 605 can also include changing the layer where a user-specified operation unit locates or the position relation between the user-specified operation unit and another operation unit in the same layer in response to a user operation, for example, dragging and dropping the operating unit through a mouse.

The editing device 101 and the editing device 501 can also create a new layer as a user-specified layer in a data analysis in response to a user operation, so as to place an added operating unit in the layer. In case that the created layer intervenes between existing layers, the editing device 101 and the editing device 501 can insert the created layer into the sequence of layers before creating.

The step 405 and the step 605 can also include creating a new layer as a user-specified layer in a data analysis in response to a user operation, so as to place an added operating unit in the layer. In case that the created layer intervenes between existing layers, it is possible to insert the created layer into the sequence of layers before creating.

The editing device 101 and the editing device 501 can also merge at least two user-specified operating units to be consecutively executed on an analysis path into a composite operation unit in response to a user operation. For example, the user can define composite operation unit by selecting operating units to be merged and submit a merging command. The connecting device 102 and the connecting device 502 can determine a connection from the composite operation unit to the analysis path by inheriting a connection from an operation unit of the composite operation unit to the analysis path. In executing the composite operation unit, the merged operating units are executed in order of executing these operating units before merging. The user interface 103 and the user interface 503 can also display the composite operation unit in an expanding and folding manner in response to a user operation.

Figure 7A:
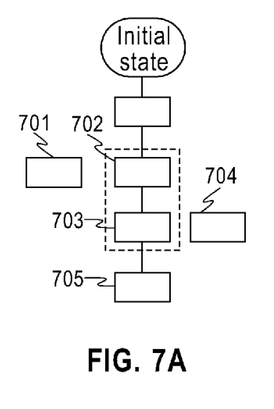
FIG. 7a shows an expanding state of a composite operation unit and FIG. 7b shows a folding state of the composite operation unit.
Figure 7B:
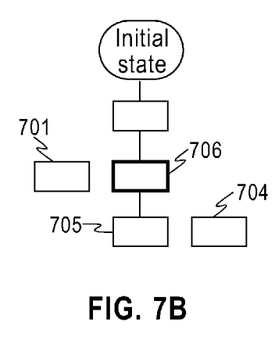

FIG. 7a shows an expanding state of a composite operation unit, where operating units 702 and 703 consecutively executed on an analysis path are merged into a composite operation unit, and the operating units 702 and 703 are represented in a visually distinguishable manner (for example, dashed line box) as belonging to one composite operation unit. FIG. 7b shows a folding state of the composite operation unit, where the composite operation unit 706 is displayed in a visually distinguishable manner (for example, thick line box) and the composite operation unit 706 inherits connections from the operating units 702 and 703 to the analysis path. Because the executing order of the operating units connected on the analysis path is not changed, the composite operation unit can be positioned in any layer where the merged operating units locate. The initial state can also be merged into a composite operation unit, and in this case, the composite operation unit can act as the initial, thereby acting as the start point of the analysis path.

The step 405 and the step 605 can also include setting at least two user-specified operating units in the same layer into a composite operation unit in response to a user operation. The step 407 and the step 607 can also include determining a connection from the composite operation unit to the analysis path by inheriting a connection from an operation unit of the composite operation unit to the analysis path. The step 409 and the step 609 can also display the composite operation unit in an expanding and folding manner in response to a user operation.

The editing device 101 and the editing device 501 can also modify a user-specified condition parameter for the condition of an operating unit in response to a user operation. For example, if condition parameters of start time and end time for defining a time period are included in a condition, it is possible to set the condition about the time period by modifying the start time and the end time. Further, the editing device 101 and the editing device 501 can also associate an operation unit before modification as a backup operation unit with the operation unit after modification, and select one of the operation unit after modification and the associated backup operation unit as an active operation unit (that is, acting as the operating unit functioning in the data analysis) in response to a user operation. For example, it is possible to display an operating unit associated with a backup operating unit, that is, the presently active operating unit, in a visually distinguishable manner (for example, with thick line box). If the user wants to adopt a backup operating unit as the presently active operating unit, it is possible to select the presently active operating unit and submit an expanding display command. Then the presently active operating unit and the backup operating unit are displayed.

Figure 7C:
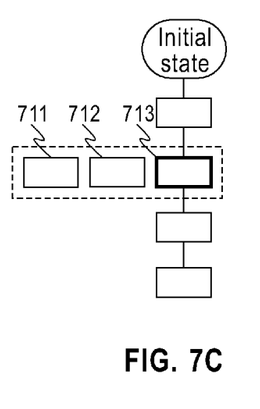
FIG. 7c shows an example of a presently active operation unit and backup operation units which are displayed in an expanding state.

FIG. 7c shows an example of an expanding display of the presently active operating unit and the backup operating unit, where the presently active operating unit 713 is display with thick line box, and the backup operation units 711 and 712 are displayed normally. The association relation of the presently active operating unit 713 with the backup operation units 711 and 712 is represented with dashed line box. In state of expanding display, the user can switch the selected backup operation unit as the active operating unit. Accordingly, the editing device can replace the previously active operating unit with the switched backup operation unit.

The step 405 and the step 605 can also include modifying a user-specified condition parameter for the condition of an operating unit in response to a user operation. Further, the step 405 and the step 605 can also include associating an operation unit before modification as a backup operation unit with the operation unit after modification, and selecting one of the operation unit after modification and the associated backup operation unit as an active operation unit (that is, acting as the operating unit functioning in the data analysis) in response to a user operation.

The connecting device 102 and the connecting device 502 can also save the analysis path and the connected operation unit, or save the user-specified operation unit, and recover the saved analysis path and the connected operation unit, or recover the user-specified operation unit, in response to a user operation. The operating units that can be saved and recovered can include composite operation units, as well as relevant operating units and their backup operation units.

The step 407 and the step 607 can also include saving the analysis path and the connected operation unit, or saving the user-specified operation unit, and recovering the saved analysis path and the connected operation unit, or recovering the user-specified operation unit, in response to a user operation.

The user interface 103 and the user interface 503 can also represent the change imposed on the data analysis by the editing device 101 and the editing device 501, and/or the connecting device 102 and the connecting device 502 in a visual manner, so that the user can visually perceive the change imposed on the data analysis by his or her operations.

It is possible to represent the change imposed on the data analysis through the step 405 and the step 605, and/or the step 407 and the step 607 in a visual manner, so that the user can visually perceive the change imposed on the data analysis by his or her operations.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, microcode, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wired line, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Figure 9:
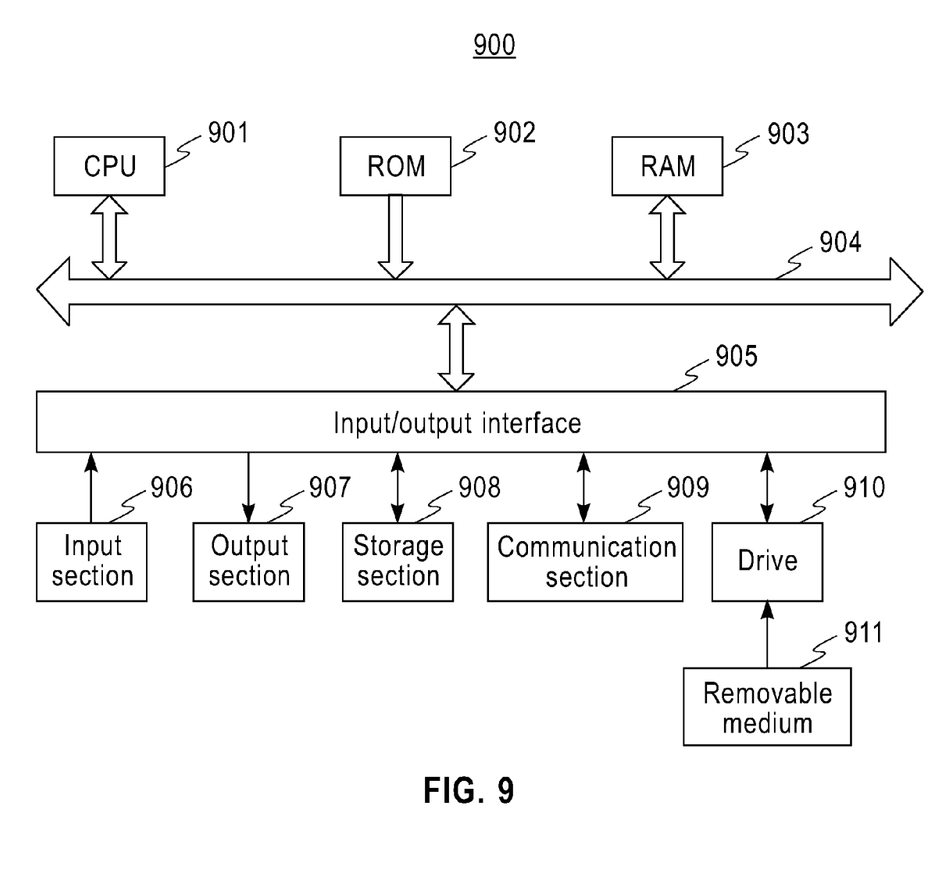
FIG. 9 is a block diagram showing the exemplary structure of a physical computer for implementing an embodiment of the present invention.

FIG. 9 is a block diagram showing an exemplary structure of a computer for implementing the apparatus and the method of the present invention.

In FIG. 9, a central processing unit (CPU) 901 performs various processes in accordance with a program stored in a read only memory (ROM) 902 or a program loaded from a storage section 908 to a random access memory (RAM) 903. In the RAM 903, data required when the CPU 901 performs the various processes or the like is also stored as required.

The CPU 901, the ROM 902 and the RAM 903 are connected to one another via a bus 904. An input/output interface 905 is also connected to the bus 904.

The following components are connected to the input/output interface 905: an input section 906 including a keyboard, a mouse, or the like; an output section 907 including a display such as a cathode ray tube (CRT), a liquid crystal display (LCD), or the like, and a loudspeaker or the like; the storage section 908 including a hard disk or the like; and a communication section 909 including a network interface card such as a LAN card, a modem, or the like. The communication section 909 performs a communication process via the network such as the internet.

A drive 910 is also connected to the input/output interface 905 as required. A removable medium 911, such as a magnetic disk, an optical disk, a magneto-optical disk, a semiconductor memory, or the like, is mounted on the drive 910 as required, so that a computer program read therefrom is installed into the storage section 908 as required.

In the case where the above-described steps and processes are implemented by the software, the program that constitutes the software is installed from the network such as the internet or the storage medium such as the removable medium 911.

One skilled in the art should note that, this storage medium is not limit to the removable medium 911 having the program stored therein as illustrated in FIG. 9, which is delivered separately from the approach for providing the program to the user. Examples of the removable medium 911 include the magnetic disk, the optical disk (including a compact disk-read only memory (CD-ROM) and a digital versatile disk (DVD)), the magneto-optical disk (including a mini-disk (MD)), and the semiconductor memory. Alternatively, the storage medium can be the ROM 902, the hard disk contained in the storage section 908, or the like, which have the program stored therein and is deliver to the user together with the method that containing them.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An apparatus for handling a data analysis, comprising:
an editing device which adds user-specified one of a plurality of operation units to a user-specified layer in a data analysis in response to a user operation, each of the operation units performing a predetermined processing on an associated data source, wherein the editing device is further configured to delete a user specified operation unit or a user—specified layer from the data analysis in response to a user operation;
a connecting device which connects at least one user-specified operation unit in the data analysis to an analysis path in response to a user operation wherein the connecting device is further configured to delete the connection from the deleted operation unit to the analysis path in the case that the user specified operation unit is deleted by the editing device located on the analysis path, and wherein the connecting device is further configured to delete the connection from an operation unit in the deleted layer to the analysis path in case the operation unit in the user—specified layer deleted by the editing device is connected on the analysis path;
a converting device which, in response to a user operation, converts operation units connected in layers where the operation units connected on the analysis path are located into instructions which can be understood by an analysis execution engine of the data analysis system in order of the layers; and
a user interface which receives the user operations and displays the data analysis by representing layers in the data analysis, operation units in the layers and connections on the analysis path in a visual manner, wherein the user interface is further configured to represent a change imposed by the editing device and the connecting device on the data analysis in a visual manner and further configured to represent an active analysis path in the data analysis in a visually distinguishable manner.

2. The apparatus according to claim 1, wherein the predetermined processing by the operation unit comprises at least one of the following:
searching the associated data source for a record meeting a condition;
performing a transaction on the associated data source; and
instructing a data analysis system to present a statistical result obtained when the data analysis system executes a previous operation unit, wherein the statistical result is presented in a specified presenting manner,
wherein, in case that the predetermined processing of the operation unit comprises searching the associated data source for a record meeting a condition, the operation unit is associated with information for instructing the data analysis system on how to gather statistics from the searched record and how to present the statistical result.

3. The apparatus according to claim 1, wherein the editing device is further configured to change the layer where a user-specified operation unit locates or to change the position relation between the user-specified operation unit and another operation unit in the same layer in response to a user operation.

4. The apparatus according to claim 1, wherein the editing device is further configured to merge at least two operation units consecutively executed on the analysis path into a composite operation unit in response to a user operation, and
the connecting device is further configured to determine a connection from the composite operation unit to the analysis path by inheriting a connection from an operation unit of the composite operation unit to the analysis path.

5. The apparatus according to claim 4, wherein the user interface is further configured to represent a change imposed by the editing device and/or the connecting device on the data analysis in a visual manner, and display the composite operation unit in an expanding and folding manner in response to a user operation.

6. The apparatus according to claim 1, wherein:
the editing device is further configured to modify a condition parameter for the condition of a user-specified operation unit in response to a user operation; and
the editing device is further configured to associate an operation unit before modification as a backup operation unit with the operation unit after modification, and select one of the operation unit after modification and the associated backup operation unit as an active operation unit in response to a user operation.

7. The apparatus according to claim 1, wherein the connecting device is further configured to save the analysis path and the connected operation unit, or save the user-specified operation unit, and recover the saved analysis path and the connected operation unit, or recover the user-specified operation unit, in response to a user operation.

8. A method of handling a data analysis, comprising:
  receiving a user operation;
  editing the data analysis, wherein editing the data analysis is adding user—specified one of a plurality of operation units to a user—specified layer in a data analysis in response to a user operation, each of the operation units performing a predetermined processing on an associated data source and wherein the editing step further comprises deleting a user—specified operation unit or a user—specified layer from the data analysis in response to a user operation;
  connecting at least one user-specified operation unit in the data analysis to an analysis path in response to a user operation, wherein the connecting step further comprises:
  deleting the connection from the deleted operation unit to the analysis path in the case that the user specified operation unit is deleted at the editing step located on the analysis path; and
  deleting the connection from an operation unit in the deleted layer to the analysis path in case the operation unit in the user—specified layer deleted at the editing step is connected on the analysis path;
  in response to a user operation, converting operation units that are connected in layers wherein the operation units connected on the analysis path are located into instructions which can be understood by an analysis execution engine of the data analysis system in order of the layers; and
  displaying the data analysis by representing layers in the data analysis, operation units in the layers and connections on the analysis path in a visual manner, wherein the displaying step further comprises:
  representing a change imposed at the editing step and the connecting step on the data analysis in a visual manner; and
  representing an active analysis path in the data analysis in a visually distinguishable manner.

9. The method according to claim 8, wherein the predetermined processing of the operation unit comprises at least one of the following steps:
  searching the associated data source for a record meeting a condition;
  performing a transaction on the associated data source; and
  instructing a data analysis system to present a statistical result obtained when the data analysis system executes a previous operation unit, wherein the statistical result is presented in a specified presenting manner;
  wherein, in case of the predetermined processing of the operation unit of searching the associated data source for a record meeting a condition, the operation unit is associated with information for instructing the data analysis system on how to gather statistics from the searched record and how to present the statistical result.

10. The method according to claim 8, wherein the editing step further comprises:
  changing the layer where a user-specified operation unit locates or changing the position relation between the user-specified operation unit and another operation unit in the same layer in response to a user operation.

11. The method according to claim 8, wherein the editing step further comprises:
  merging at least two operation units consecutively executed on the analysis path into a complex operation unit in response to a user operation, wherein the connecting step further comprises:
  determining a connection from the complex operation unit to the analysis path by inheriting a connection from an operation unit of the complex operation unit to the analysis path; and
  representing a change imposed at the editing step and/or the connecting step on the data analysis in a visual manner, and displaying the complex operation unit in an expanding and folding manner in response to a user operation.

12. The method according to claim 8, wherein the editing step further comprises:
  modifying a condition parameter for the condition of a user-specified operation unit in response to a user operation; and wherein the editing step further comprises:
  associating an operation unit before modification as a backup operation unit with the operation unit after modification; and
  selecting one of the operation unit after modification and the associated backup operation unit as an active operation unit in response to a user operation.

13. The method according to claim 8, wherein the connecting step further comprises:
  saving the analysis path and the connected operation unit, or saving the user-specified operation unit, and recovering the saved analysis path and the connected operation unit, or recovering the user-specified operation unit, in response to a user operation.

14. A computer readable non-transitory storage medium tangibly embodying a computer readable program code having computer readable instructions which, when implemented, cause a computer to carry out the steps of the method of claim 8.

* * * * *